(12) United States Patent
Nakamura et al.

(10) Patent No.: US 10,953,845 B2
(45) Date of Patent: Mar. 23, 2021

(54) COLLIDING OBJECT PROTECTION APPARATUS

(71) Applicant: HONDA MOTOR CO., LTD., Tokyo (JP)

(72) Inventors: Hidetoshi Nakamura, Wako (JP); Kenyu Okamura, Wako (JP); Masaki Umezawa, Wako (JP); Osamu Ito, Wako (JP); Masato Sasaki, Wako (JP); Masahiro Motoyoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/429,400

(22) Filed: Jun. 3, 2019

(65) Prior Publication Data
US 2019/0366971 A1 Dec. 5, 2019

(30) Foreign Application Priority Data
Jun. 4, 2018 (JP) .............................. JP2018-107106

(51) Int. Cl.
*B60R 21/36* (2011.01)
*B60R 21/00* (2006.01)
*B60R 21/0134* (2006.01)
*B60R 21/0136* (2006.01)
*B60R 21/34* (2011.01)

(52) U.S. Cl.
CPC .............. *B60R 21/36* (2013.01); *B60R 21/00* (2013.01); *B60R 21/0134* (2013.01); *B60R 21/0136* (2013.01); *B60R 2021/0004* (2013.01); *B60R 2021/346* (2013.01)

(58) Field of Classification Search
CPC ................................. B60R 21/36; B60R 21/34
See application file for complete search history.

(56) References Cited

U.S. PATENT DOCUMENTS

| 2004/0074690 | A1* | 4/2004 | Sato ........................ | B60R 21/36 |
| | | | | 180/274 |
| 2009/0289471 | A1* | 11/2009 | Finney .................... | B60R 19/40 |
| | | | | 296/187.04 |
| 2017/0282845 | A1 | 10/2017 | Nagasawa et al. | |
| 2019/0001919 | A1* | 1/2019 | Farooq .................... | B60R 21/36 |

FOREIGN PATENT DOCUMENTS

JP        2017-178211 A       10/2017

* cited by examiner

*Primary Examiner* — Paul N Dickson
*Assistant Examiner* — Daniel M. Keck
(74) *Attorney, Agent, or Firm* — Rankin, Hill & Clark LLP

(57) ABSTRACT

A colliding object protection apparatus inflates and deploys an airbag when the apparatus detects or predicts a collision with a pedestrian. The airbag includes a front bag to be inflated and deployed in a vehicle width direction along an upper part of a front grille of a vehicle. The internal space of the front bag is partitioned into a plurality of expansion chambers by a plurality of partitioning walls provided in parallel in the vehicle width direction. A vent mechanism of the expansion chamber is configured to be opened when an internal pressure of the expansion chamber reaches a predetermined pressure.

3 Claims, 5 Drawing Sheets

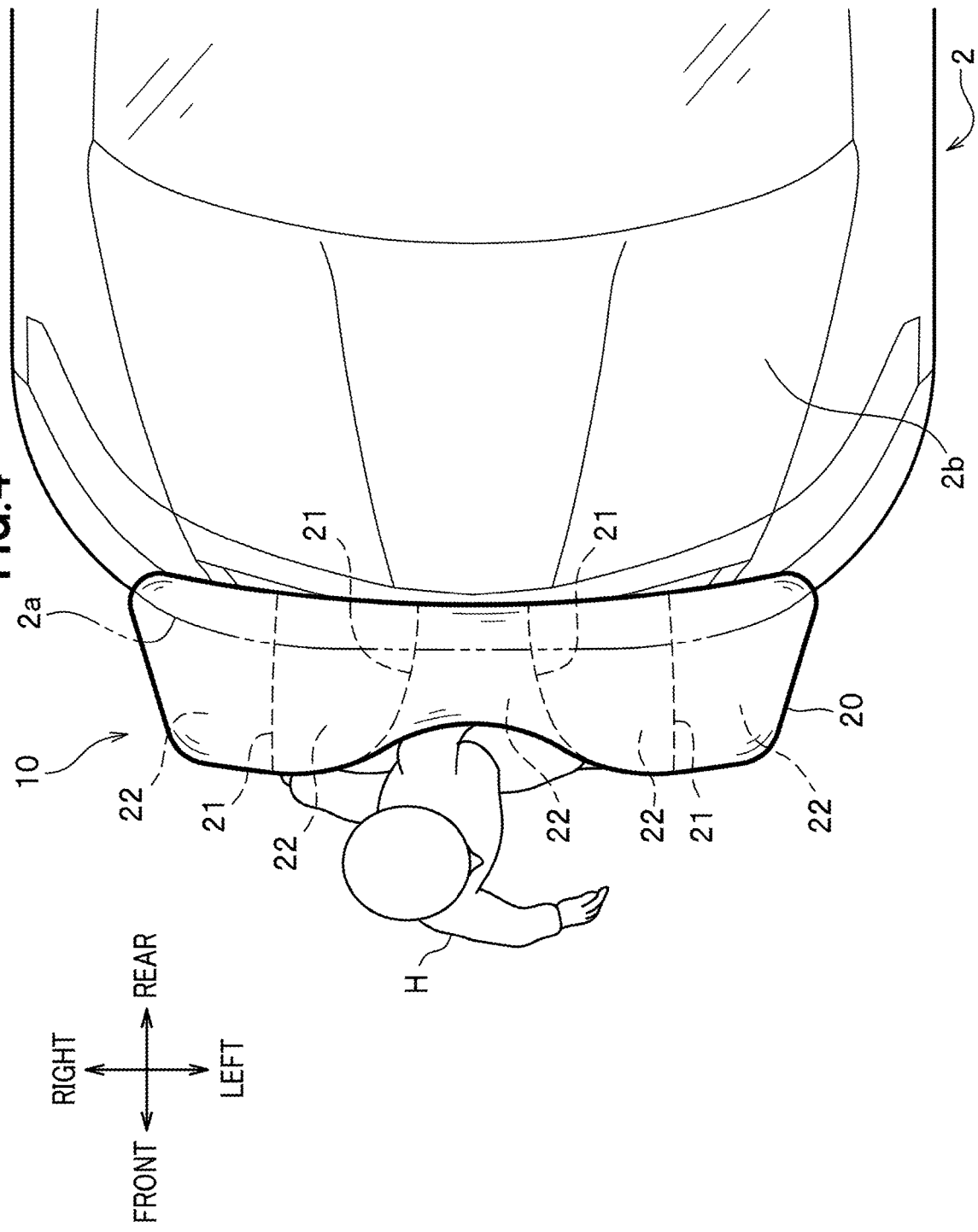

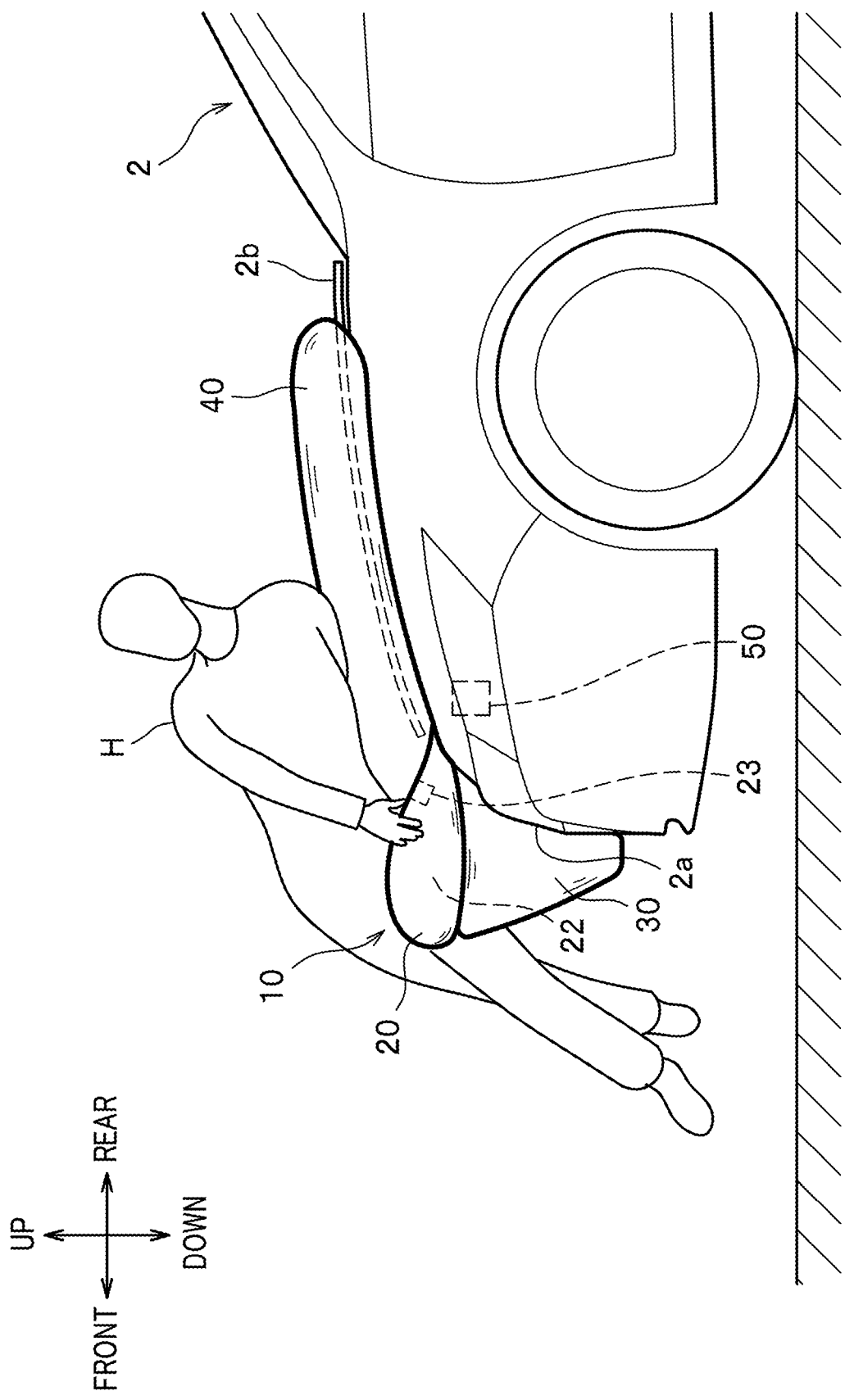

COLLIDING OBJECT PROTECTION APPARATUS

BACKGROUND OF THE INVENTION

1. Field of the Invention

The present invention relates to a colliding object protection apparatus for protecting a colliding object by absorbing and relaxing an impact applied to the colliding object in case of a collision of a vehicle with the colliding object.

2. Description of the Related Art

A typical colliding object protection apparatus to be mounted on a vehicle is configured to inflate and deploy an airbag onto an upper part of a front grill when the apparatus detects or predicts a collision of a colliding object with the vehicle (see Japanese Patent Application Publication No. 2017-178211, for example).

SUMMARY OF THE INVENTION

In order to effectively prevent a pedestrian from being injured if a vehicle collides with the pedestrian, it is desirable to restrain behavior of the pedestrian by surely catching the pedestrian with an airbag and rapidly eliminating a difference in speed between the vehicle and the pedestrian.

In view of the above, it is an object of the present invention to provide a colliding object protection apparatus which is capable of effectively preventing a colliding object from being injured by restraining behavior of the colliding object when the colliding object collides with a vehicle.

To attain the object, the present invention provides a colliding object protection apparatus that inflates and deploys an airbag when the apparatus detects or predicts a collision with a colliding object. Here, the airbag includes a front bag to be inflated and deployed in a vehicle width direction along an upper part of a front grille of a vehicle. The internal space of the front bag is partitioned into a plurality of expansion chambers by a plurality of partitioning walls provided in parallel in the vehicle width direction, and a vent mechanism of the expansion chamber is configured to be opened when an internal pressure of the expansion chamber reaches a predetermined pressure.

The colliding object protection apparatus of the present invention can rapidly eliminate a difference in speed between a vehicle and a colliding object in case of a collision, thereby restraining behavior of the colliding object. Thus, the colliding object protection apparatus can effectively prevent the colliding object from being injured. In addition, the apparatus can stabilize a shape of the front bag and increase strength of the front bag.

BRIEF DESCRIPTION OF THE DRAWINGS

FIG. 4 is a plan view showing the colliding object protection apparatus according to the embodiment of the present invention in a state immediately after the collision.

FIG. 5 is another side view showing the colliding object protection apparatus according to the embodiment of the present invention in the state after the collision.

DETAILED DESCRIPTION OF THE EMBODIMENTS

An embodiment of the present invention will be described in detail with reference to the drawings as appropriate.

In this embodiment, a description will be given of a colliding object protection apparatus for absorbing and relaxing an impact to be applied to a pedestrian being a colliding object if a vehicle being an automobile collides with the pedestrian when the vehicle is in motion.

Figure 2:
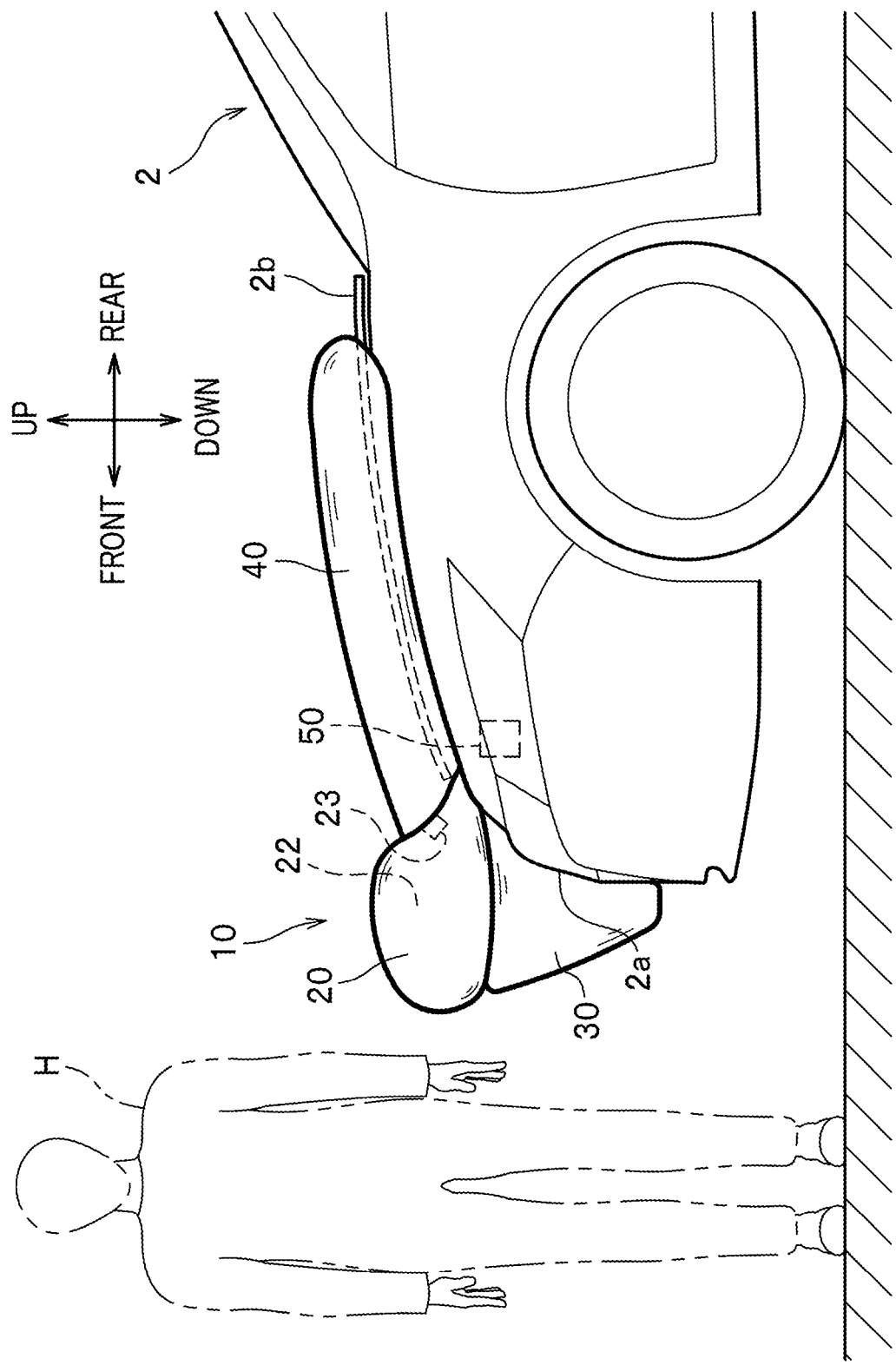
FIG. 2 is a side view showing the colliding object protection apparatus according to the embodiment of the present invention.

As shown in FIG. 2, a colliding object protection apparatus 1 includes an airbag 10 which is inflated and deployed on a front part of a vehicle 2, an inflator 50 which sends a gas into the airbag 10, and a collision determination device (not shown).

The collision determination device is formed from an electronic control unit (ECU) configured to detect or predict a collision of the vehicle 2 with a colliding object based on signals from sensors and a radar mounted on the vehicle 2.

When the collision determination device detects or predicts a collision of a pedestrian H with the vehicle 2, the vehicle 2 lifts up a hood 2b and the inflator 50 is activated in the meantime. Note that the collision determination device is formed from an existing device and its configuration is not limited.

Figure 1:
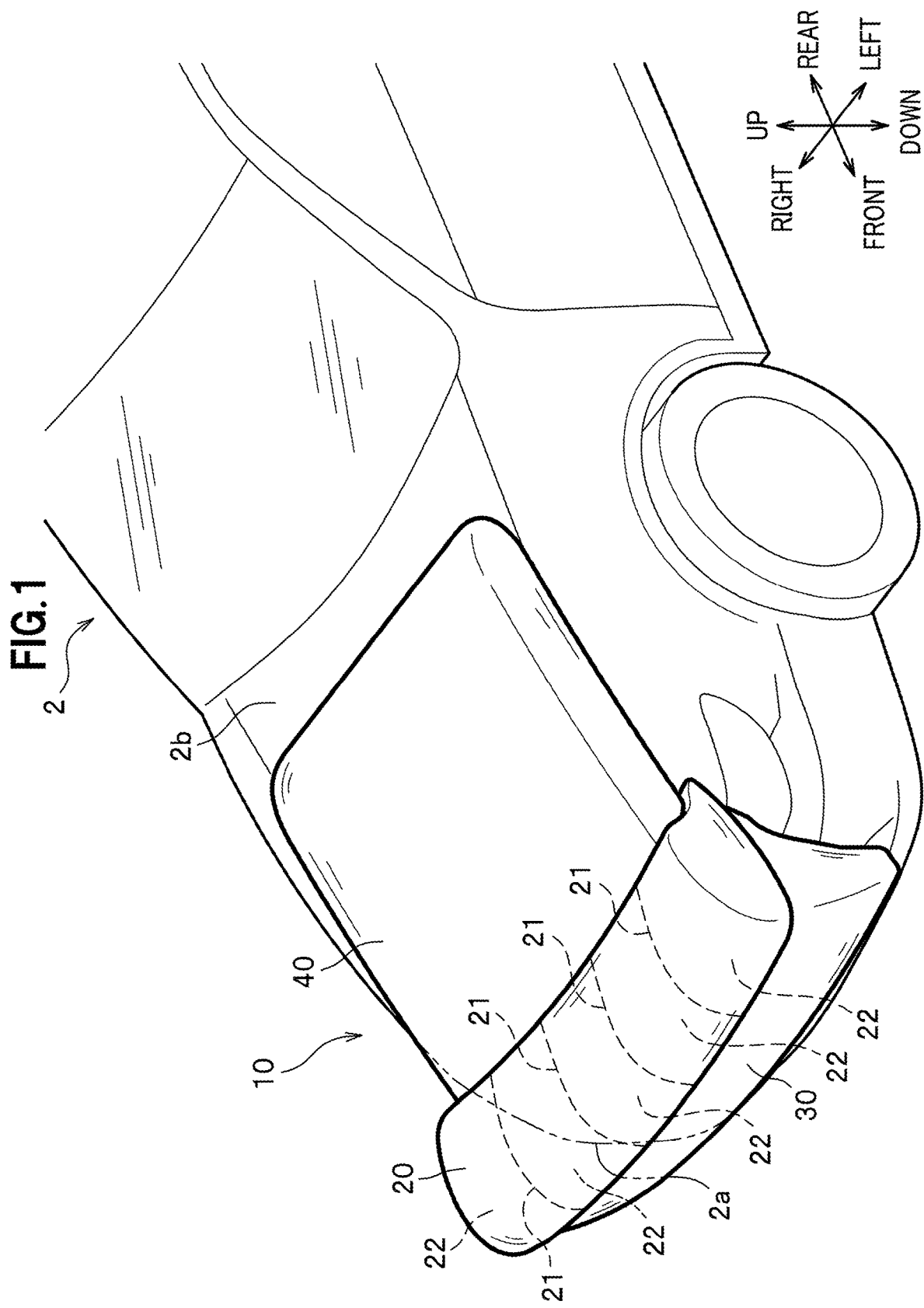
FIG. 1 is a perspective view showing a colliding object protection apparatus according to an embodiment of the present invention.

As shown in FIG. 1, the airbag 10 includes a front bag 20 to be deployed above the front grill 2a, and a lower bag 30 to be deployed in front of the front grille 2a, and an upper bag 40 to be deployed on an upper surface of the hood 2b.

The airbag 10 of this embodiment is housed inside an engine room located below the hood 2b in normal times. When the collision determination device detects or predicts the collision of the pedestrian H with the vehicle 2, the hood 2b is lifted up and the airbag 10 is inflated and deployed from a gap between the hood 2b and a front grill 2a to the outside of the vehicle 2 as shown in FIG. 2.

As shown in FIG. 1, the front bag 20 is a tubular bag to be inflated and deployed along the upper edge part of the front grille 2a. As shown in FIG. 2, the front bag 20 is folded and stored in such a manner that the front bag 20 inflated and deployed upward at first, and then further inflated and deployed frontward.

Further, the front bag 20 of this embodiment is designed to be inflated and deployed in a height range of 700 mm to 980 mm from the ground level. This height range corresponds to the height of the waist of a normal pedestrian H.

The inner space of the front bag 20 is partitioned into a plurality of expansion chambers 22 by a plurality of partitioning walls provided in parallel in the vehicle width direction as shown in FIG. 1. Pipes from the inflator 50 shown in FIG. 2 are connected to each of the expansion chambers 22.

The inflator 50 supplies gas to each of the expansion chambers 22 individually.

The expansion chamber 22 is provided with a vent mechanism 23. The vent mechanism 23 is opened when an internal pressure of the expansion chamber 22 reaches a predetermined pressure, whereby the gas in the expansion chamber 22 is discharged. Note that the configuration of the vent mechanism 23 is not limited. For example, an opening connected to the expansion chamber 22 may be formed at a wall part of the front bag 20 and a lid on the opening may come off to open the opening when the internal pressure of the expansion chamber 22 reaches the predetermined pressure.

As shown in FIG. 1, the lower bag 30 is a cylindrical bag that is continuous with the rear part of the front bag 20. The lower bag 30 is inflated and deployed downward along the front surface of the front grille 2a. To the lower bag 30 is supplied gas from the inflator shown in FIG. 2. The lower bag 30 is designed to be inflated and deployed in a height range corresponding to the height of the waist of a normal pedestrian H The upper bag 40 is a bag that is continuous with the rear part of the front bag 20. As shown in FIG. 1, the upper bag 40 is inflated and deployed rearward along the front surface of the hood 2b. The upper bag 40 is designed to cover a substantially entire part of the upper surface of the hood 2b.

As shown in FIG. 2, the internal space of each of the expansion chambers and the internal space of the upper bag 40 communicate with each other through the vent mechanism 23.

Next, a process of the inflation and deployment of the airbag 10 in the colliding object protection apparatus 1 of this embodiment will be described.

Figure 3:
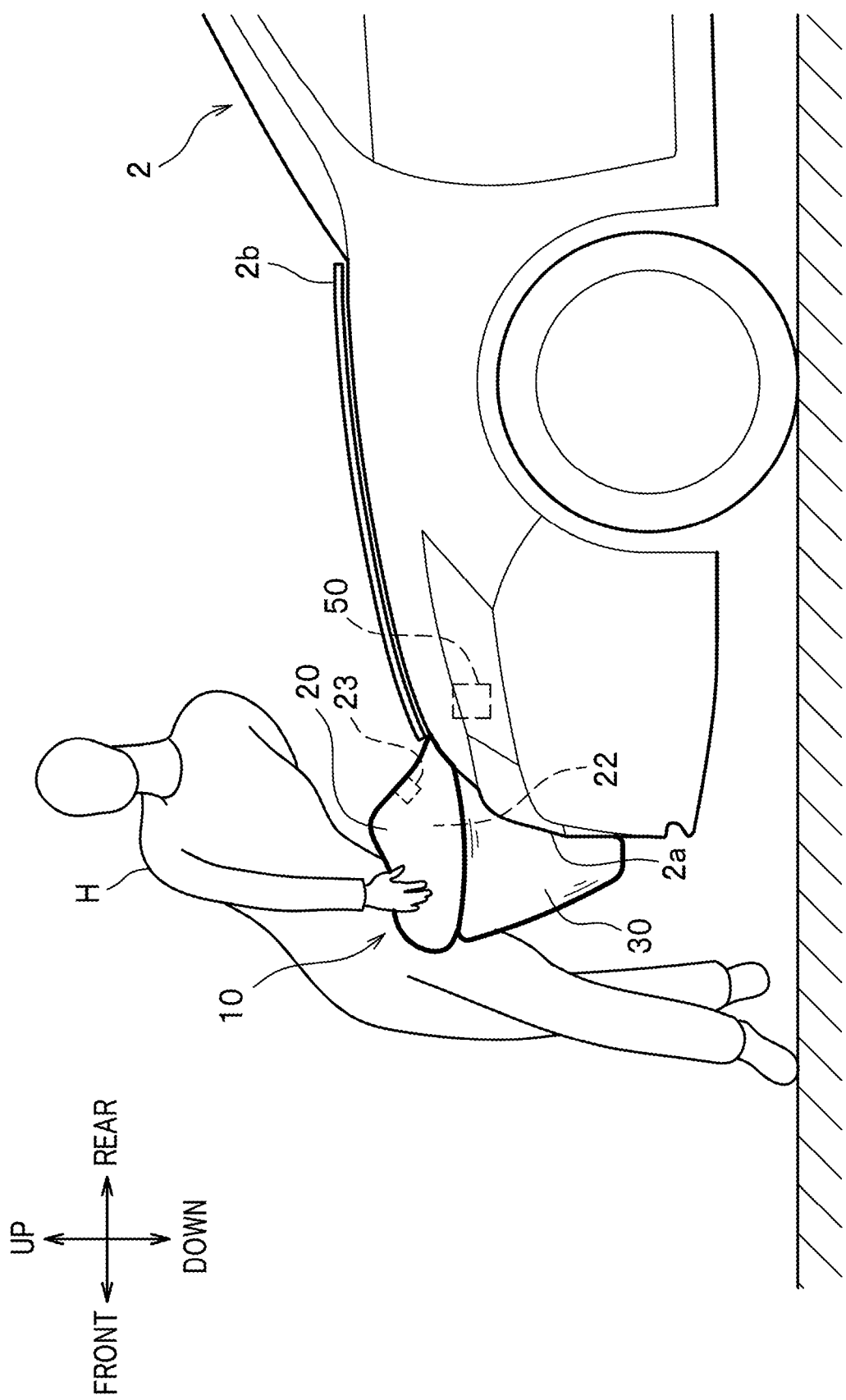
FIG. 3 is a side view showing the colliding object protection apparatus according to the embodiment of the present invention in a state immediately after a collision.

As shown in FIG. 3, when the collision determination device (not shown) detects or predicts the collision of the pedestrian H with the vehicle 2, the hood 2b of the vehicle 2 is lifted up and the inflator 50 is activated.

When the gas is sent from the inflator 50 into the front bag 20, the front bag 20 is inflated and deployed above the front grille 2a. Further, when the gas is sent from the inflator 50 into the lower bag 30, the lower bag 30 is inflated and deployed in front of the front grille 2a.

As shown in FIG. 5, when the gas is sent from the inflator 50 into the front bag 20 and the front bag 20 is pushed in as a consequence of the collision of the pedestrian H with the front bag 20, the internal pressure of the expansion chamber 22 reaches the predetermined first pressure. Accordingly, the vent mechanism 23 is opened and the gas is sent from the front bag 20 into the upper bag 40 whereby the upper bag 40 is inflated and deployed on the upper surface of the hood 2b.

As shown in FIG. 2, the colliding object protection apparatus 1 of this embodiment is configured to inflate and deploy the airbag 10 when the collision of the pedestrian H is detected or predicted. The airbag 10 includes the front bag 20 to be inflated and deployed along the upper part of the front grille 2a. The internal space of the front bag 20 is partitioned into the plurality of the expansion chambers 22 by the plurality of partitioning walls provided in parallel in the vehicle width direction. The vent mechanism 23 of the expansion chamber 22 is designed to be opened when the internal pressure of the expansion chamber 22 reaches the predetermined first pressure.

According to the colliding object protection apparatus 1 of this embodiment, even when the front bag 20 is inflated and deployed, the vent mechanism 23 is not opened until the internal pressure of the expansion chamber reaches the predetermined pressure. Thus, it is possible to increase the internal pressure of the expansion chamber 22 quickly.

Further as the pedestrian H is sandwiched by the expansion chambers 22 arranged on opposite sides of the expansion chamber 22 which is pushed in by the pedestrian, the front bag 20 can surely catch the waist of the pedestrian H as shown in FIG. 4.

As described above, the colliding object protection apparatus 1 can rapidly eliminate a difference in speed between the vehicle 2 and the pedestrian H by catching the waist of the pedestrian H being the position of the center of gravity of the pedestrian H in case of the collision as shown in FIG. 3. Thus, the colliding object protection apparatus 1 can restrain behavior of the pedestrian H. In other words, the colliding object protection apparatus 1 can control the behavior of the pedestrian H so as not to flip up the legs of the pedestrian H too much.

Moreover, by catching the waist of the pedestrian H which is the position of the center of gravity, it is possible to prevent the head of the pedestrian H from colliding with a pillar or a front windshield of the vehicle 2.

Therefore, according to the colliding object protection apparatus 1, it is possible to reliably protect the pedestrian H by using the airbag 10, and thus to effectively prevent the pedestrian H from being injured.

Further, it is possible to stabilize the shape of the front bag 20 while enhancing the strength of the front bag 20 by providing the plurality of the partitioning walls 21 in the front bag 20 as shown in FIG. 1. In this way, the front bag 20 can prevent a deformation of the hood 2b.

Furthermore, as the inflator 50 supplies gas individually to each of the expansion chambers 22 as shown in FIG. 3, the internal pressure of each of the expansion chambers 22 can be increased quickly.

Further, the colliding object protection apparatus 1 of this embodiment allows to quickly increase the internal pressure of the front bag 20 with the smaller inflator 50 compared to a case where the inner space of the front bag 20 and the inner space of the upper bag 40 constitutes one space.

In addition, since the front bag 20 is designed to be inflated and deployed frontward of the vehicle after inflated and deployed upward, the front bag 20 can be inflated and deployed even after the pedestrian H collides with the vehicle 2. Accordingly, it is possible to securely protect the pedestrian H even in a situation where the collision determination device can hardly recognize the pedestrian H.

As shown in FIG. 1, the colliding object protection apparatus 1 of this embodiment includes the upper bag 40 which is designed to be inflated and deployed on the upper surface of the hood 2b. The internal space of the expansion chamber 22 and the internal space of the upper bag 40 communicate with each other through the vent mechanism 23.

According to this structure, the vent mechanism 23 is opened when the internal pressure of the front bag 20 reaches the predetermined pressure, whereby the gas is sent from the front bag 20 into the upper bag 40. In this way, the upper bag 40 is inflated and deployed on the upper surface of the hood 2b as shown in FIG. 5. Accordingly, it is possible to reliably protect the upper body of the pedestrian H falling onto the hood 2b by using the upper bag 40.

The air bag 10 of the colliding object protection apparatus 1 of the embodiment includes the lower bag 30 which is inflated and deployed in front of the front grille 2a as shown in FIG. 2. Accordingly it is possible to prevent the legs of the pedestrian H from being caught under the vehicle 2

Although the embodiment of the present invention has been described above, it is to be understood that the present invention is not limited only to this embodiment and appropriate modifications are possible within a range not departing from the scope of the invention.

In the colliding object protection apparatus 1 of this embodiment, the airbag 10 is inflated and deployed from the gap between the front grill 2a and the hood 2b to the outside of the vehicle 2 as shown in FIG. 2. However, the location to house the airbag 10 is not limited. For instance, the airbag 10 may be housed in the front grill 2*a* and a lid provided to the front grill 2*a* may be pushed and opened to inflate and deploy the airbag 10 therefrom.

The colliding object protection apparatus 1 of this embodiment includes the upper bag 40. However, the upper bag 40 does not always have to be provided if the head of the pedestrian H can be protected by using the hood 2*b*.

Further, the colliding object protection apparatus 1 of the embodiment includes the lower bag 30 which is to be inflated and deployed on a front surface of the front grill 2*a*, however, the lower bag 30 may not be provided. In this case, a protection member, such as a panel or a stay, may be provided to prevent the legs of the pedestrian H from being caught in a portion under the vehicle 2.

Furthermore, in the colliding object protection apparatus 1 of the embodiment the front bag 20 is described to be inflated and deployed frontward after being inflated and deployed upward. However, the trait of the inflation of the front bag 20 is not limited to the foregoing.

What is claimed is:

1. A colliding object protection apparatus to inflate and deploy an airbag when the apparatus detects or predicts a collision with a colliding object, the apparatus comprising the airbag, wherein the airbag includes a front bag to be inflated and deployed in a vehicle width direction along an upper part of a front grille of a vehicle, and an upper bag configured to be inflated and deployed on the upper surface of a hood of the vehicle, an internal space of the front bag is partitioned, in the vehicle width direction, into a plurality of expansion chambers by a plurality of partitioning walls, an internal space of each of the plurality of expansion chambers and an internal space of the upper bag communicate with each other through a vent mechanism provided in each of the plurality of expansion chambers, and the vent mechanism provided in each of the plurality of expansion chambers is configured to be opened when an internal pressure of the each of the plurality of expansion chambers reaches a predetermined pressure.

2. The colliding object protection apparatus according to claim 1, wherein the airbag includes a lower bag to be inflated and deployed in front of the front grille.

3. The colliding object protection apparatus according to claim 1, further comprising an inflator and pipes which respectively connect the inflator to each of the plurality of expansion chambers, wherein the inflator and the pipes are configured so that the inflator supplies gas to each of the plurality of expansion chambers individually.

* * * * *